(12) United States Patent
Li et al.

(10) Patent No.: US 12,304,505 B2
(45) Date of Patent: May 20, 2025

(54) ENDOGENIC PROTECTION METHOD FOR FUNCTION SECURITY AND NETWORK SECURITY OF SENSING AND DECISION-MAKING MODULE OF INTELLIGENT CONNECTED VEHICLE

(71) Applicant: SHANGHAI UNIVERSITY, Shanghai (CN)

(72) Inventors: Yufeng Li, Shanghai (CN); Shaorong Xie, Shanghai (CN); Jiangtao Li, Shanghai (CN); Chenhong Cao, Shanghai (CN); Peng Wang, Shanghai (CN); Guiqi Zhang, Shanghai (CN); Qi Liu, Shanghai (CN)

(73) Assignee: SHANGHAI UNIVERSITY, Shanghai (CN)

(*) Notice: Subject to any disclaimer, the term of this patent is extended or adjusted under 35 U.S.C. 154(b) by 203 days.

(21) Appl. No.: 18/142,965

(22) Filed: May 3, 2023

(65) Prior Publication Data
US 2023/0286519 A1 Sep. 14, 2023

Related U.S. Application Data

(63) Continuation of application No. PCT/CN2021/099117, filed on Jun. 9, 2021.

(30) Foreign Application Priority Data

Nov. 3, 2020 (CN) .......................... 202011208015.9

(51) Int. Cl.
*B60W 50/00* (2006.01)
*B60R 16/023* (2006.01)
*B60W 60/00* (2020.01)

(52) U.S. Cl.
CPC ..... *B60W 50/0098* (2013.01); *B60R 16/0231* (2013.01); *B60W 60/001* (2020.02);
(Continued)

(58) Field of Classification Search
CPC .......... B60W 50/0098; B60W 60/001; B60W 2420/408; B60W 2552/53;
(Continued)

(56) References Cited

U.S. PATENT DOCUMENTS

2020/0160168 A1 5/2020 Yang et al.
2022/0161815 A1* 5/2022 Van Beek ............. B60W 50/00

FOREIGN PATENT DOCUMENTS

| CN | 108225364 A | 6/2018 |
| CN | 109150831 A | 1/2019 |

(Continued)

OTHER PUBLICATIONS

International Search Report of PCT /CN2021/099117.
Written Opinion of PCT/CN2021/099117.

*Primary Examiner* — Peter D Nolan
*Assistant Examiner* — Chanmin Park
(74) *Attorney, Agent, or Firm* — Hemisphere Law, PLLC; Zhigang Ma

(57) ABSTRACT

An endogenic protection method for function security and network security of a sensing and decision-making module of an intelligent connected vehicle, including the following steps: designing and implementing four sensing and decision-making units having the same function and a certain degree of heterogeneity, and deploying same on a vehicle; the four units respectively deducing real-time vehicle control decision-making results according to sensed information; an arbiter performing accurate arbitration and approximate arbitration according to decision-making results of three of the sensing and decision-making units; and finally, (Continued)

according to different decision-making results of the arbiter, the vehicle executing a CAN command, or replacing an anomalous unit and performing arbitration again, or operating according to a failure mode until the vehicle stops. Said method provides, by using the idea of endogenic security, an intelligent connected vehicle with a new solution for enhancing function security and network security in an integrated manner.

3 Claims, 2 Drawing Sheets

(52) U.S. Cl.
CPC ... *B60W 2420/408* (2024.01); *B60W 2552/53* (2020.02); *B60W 2554/00* (2020.02); *B60W 2555/60* (2020.02); *B60W 2556/35* (2020.02)

(58) Field of Classification Search
CPC ......... B60W 2554/00; B60W 2555/60; B60W 2556/35; B60W 2050/0043; B60W 2050/0075; B60W 2556/45; B60R 16/0231; H04L 67/52; H04L 63/14
See application file for complete search history.

(56) References Cited

FOREIGN PATENT DOCUMENTS

| | | |
|---|---|---|
| CN | 110691107 A | 1/2020 |
| CN | 110956851 A | 4/2020 |
| CN | 111241552 A | 6/2020 |
| CN | 112406892 A | 2/2021 |
| JP | 0840295 A | 2/1996 |

\* cited by examiner

ENDOGENIC PROTECTION METHOD FOR FUNCTION SECURITY AND NETWORK SECURITY OF SENSING AND DECISION-MAKING MODULE OF INTELLIGENT CONNECTED VEHICLE

CROSS-REFERENCE TO RELATED APPLICATIONS

This application is a bypass continuation application of PCT application no.: PCT/CN2021/099117. This application claims priorities from PCT Application PCT/CN2021/099117, filed Jun. 9, 2021, and from Chinese patent application 202011208015.9, filed Nov. 3, 2020, the contents of which are incorporated herein in the entirety by reference.

TECHNICAL FIELD

The disclosure belongs to the field of intelligent connected vehicle security, and specifically relates to an endogenous guarantee method for the functional safety and network security of the intelligent connected vehicle perception and decision-making module.

BACKGROUND

The intelligent connected vehicle allows the vehicle to sense its surrounding environment with the help of on-board sensors, and use the on-board communication module to communicate with the surrounding vehicles and roadside units to obtain the real-time road conditions. Subsequently, the on-board system makes decisions by analyzing various data obtained from its perception and communication to determine whether the vehicle needs to accelerate, decelerate or steer at present. At last, the on-board system sends its decision results to the vehicle CAN bus in the form of CAN commands, so that it controls the vehicle to achieve the purpose of auxiliary driving or even automatic driving. The perception, communication and decision-making system above is usually called the vehicle's perception and decision-making module, which is the key component of the intelligent connected vehicle.

With the continuous development of artificial intelligence technology and communication technology, the degree of automobile intelligence and connectedness is becoming higher and higher. At the same time, the development of intelligent connected vehicles is also facing the dual challenges of functional safety and network security. First of all, with the increasing complexity of the automobile system, the risk of failure of its software and hardware systems is also increasing. Therefore, cars need to avoid unreasonable risks caused by electrical/electronic system failures, which is called functional safety. Secondly, because the intelligent connected vehicle is connected to the network, it has more exposure and is more vulnerable to network attacks. Therefore, intelligent connected vehicles need to avoid being intruded into the vehicle system by the enemy due to network attacks, thereby endangering vehicle safety and personal safety. This security requirement is called network security.

Generally speaking, while ensuring that the vehicle is not subject to network attacks, it often increases the complexity of the system software and hardware equipment, resulting in the weakening of the vehicle functional safety. Therefore, it is a difficult problem in the field of ICV security on how to simultaneously enhance the functional safety and network security of the ICV.

SUMMARY

The purpose of the disclosure is to overcome the shortcomings of the existing technology, which means to provide an endogenous guarantee method for the functional safety and network security of the perception and decision-making module, aiming at the problem that the functional safety and network security of the intelligent connected vehicle are difficult to be enhanced at the same time. This method adopts the idea of endogenous security, and enhances its functional safety and network security capabilities to resist known and unknown system failures and various network attacks by implementing multiple heterogeneous units of the perception and decision-making module.

In order to achieve the purpose above, the disclosure adopts the following technical schemes:

An endogenous guarantee method for the functional safety and network security of the intelligent connected vehicle perception decision-making module is characterized in that it includes the following steps:

(1) Design and implement multiple heterogeneous perception and decision-making units and deploy them on vehicles. The main features of multiple perception and decision-making units include:

(1.1) It contains a higher-level and several lower-level perception and decision-making units. The higher-level perception and decision-making unit described above supports autopilot of SAE L3, L4 or L5, while the lower-levels support the SAE L3 or L2.

(1.2) The higher-level perception and decision-making unit described as the main brain of autopilot has the components and functions, including light detection and ranging (LIDAR), radio detection and ranging radar, camera, global positioning system (GPS), inertial measurement unit (IMU), odometer sensor, traffic signal detection (TSD) subsystem, moving object tracking (MOT) subsystem, mapper subsystem, localizer subsystem, and so on, which required to support autopilot of SAE L3, L4 or L5. It receives all kinds of sensor data and fuses data to get the needed information to the car to complete its task, while the information includes the info of pedestrians, vehicles and obstacles, the info of lane lines, driving areas, traffic signs and signals, and the info of unmanned vehicle positioning and map based on GPS and IMU inertial navigation. In addition, based on the above sensory information, the main brain combines the prior information of road network, traffic rules and automotive dynamics to form route planning, path planning, behavior selection, motion planning, obstacle avoidance and control decision-making.

(1.3) The described multiple relatively low-level perception and decision units should have the components and perception functions that required to support autopilot of SAE L2 or L3. And components include radio detection and ranging radar, camera, autopilot sensors of L2 or L3, while functions include obstacle detection, collision warning, lane detection and lane deviation warning.

(1.4) The higher-level perception and decision-making unit described here is an L4 self-automatic driving perceptual decision unit with the perceptual and planning functions described in Section (1.2), which forms the decision results for auto-driving and is ultimately sent to the various ECU execution components of the vehicle to achieve control over the vehicle. Set the decision results to: $F=\{x,y,z,w,u,v \ldots \}$, where x, y etc. represents the decision results given by the perceptual decision unit, including turning, accelerating, braking, parking.

(1.5) The multiple relatively low-level perception and decision-making units described are composed of one L3 and two L2 perceptual decision units that have the perceptual capabilities in the step (1.3) and are able to form auto-driving decision results based on the perceptual results. The decision results are: W={x,y,z,w,u . . . }, U={x,y,z,w}, V={x,y,z,w}.

(1.6) The following relationships exist: U∩V∩W∩F={x,y,z,w}, where x,y,z,w are true-value type data, indicating whether to turn left, right, accelerated or braked, respectively.

(1.7) The high-level and several relatively low-level perception and decision-making units are all designed with isomerization, while selecting different hardware platforms, such as field bus, arm and x86 platforms, different operating systems, and different perceptual decision modules.

(2) During vehicle driving, each perception and decision-making unit makes decisions based on the perceived information. Its main features include:

(2.1) The decision results incorporate information perceived from multiple dimensions, including video information, radar information, vehicle location, speed, and acceleration.

(2.2) The decision algorithm for each unit covers at least three cases:

(2.2.1) It makes a turn decision based on the perceived results and issues turn instructions, including the target turn angle and the target angular speed of steering wheel.

(2.2.2) A brake command is sent when the headway $\tau=l/v$ is detected to be less than a certain value, where l represents the distance from the shop and v represents the speed of the car.

(2.2.3) A brake command is sent when the time-to-collision $ttc=l/(v_1-v_2)$ is detected to be less than a certain value, where l represents the distance from the shop, $v_1$ represents the speed of the car and $v_2$ indicates the speed of the vehicle ahead or the speed of the pedestrian.

(3) The decision results of the high-level units and two relatively low-level units in the four perception and decision-making units are sent to the arbiter for adjudication, and another low-level perceptual decision unit is always online, but not on the loop, and will not participate in adjudication temporarily. The decision result of the i-th perceptive decision module sent to the arbiter is represented as $<x_i,y_i,z_i,w_i|a_i,b_i,c_i,d_i>$, where i=1,2,3, $x_i,y_i,z_i,w_i$ is true-value type data, indicating whether to turn left, right, accelerate and brake; $a_i,b_i,c_i,d_i$ is floating point data, representing the target angle of left turn, the target angle of right turn, the acceleration and the braking force respectively. The adjudication process is divided into two stages, including:

(3.1) Precise decision stage:

At this stage, the arbiter judges whether $(x_1,y_1,z_1,w_1)=(x_2,y_2,z_2,w_2)=(x_3,y_3,z_3,w_3)$ is true. If the equation is true, it enters the approximate adjudication stage. Otherwise, it is considered that there is an unsafe perception and decision-making unit and outputs ⊥.

(3.2) Approximate adjudication stage:

At this stage, for any i,j∈1,2,3, i≠j, the arbiter judges whether $\sqrt{(a_i-a_j)^2+(b_i-b_j)^2+(c_i-c_j)^2+(d_i-d_j)^2} \le \theta$ is true, where θ indicates the approximate coefficient allowed by the system. If the equation is true, the decision results of the higher-level perception and decision-making unit will be output. Otherwise, the ⊥ will be output.

(4) When the arbiter outputs a decision result, the decision result will be directly sent to the CAN bus, and the vehicle will execute the command Otherwise, when the arbiter outputs ⊥, the vehicle will make the following processing according to the situation.

(4.1) If there exists i,j∈1,2,3, i≠j, that makes $(x_i,y_i,z_i,w_i)=(x_1,y_1,z_1,w_1)$ and, $\sqrt{(a_i-a_j)^2+(b_i-b_j)^2+(c_i-c_j)^2+(d_i-d_j)^2} \le \theta$ tenable, then replacing the k-th unit by using the online unit that does not participate in the adjudication, where k∈{1,2,3}, k≠i, k≠j.

(4.2) Otherwise, the vehicle will operate according to the preset bottom line security procedure until it stops or someone intervenes.

Preferably, in the step (3), the two stages of the decision are all dependent on hardware implementation.

Preferably, in the step (4), the replacement process completes the replacement of abnormal units in seconds by quickly scheduling the 'online not in the loop' perception and decision-making units to 'go up the loop'.

Preferably, the adjudication process does not pay attention to the cause of the exception, but only makes the exception judgment through the comparison strategy. The reason of the exception is the system exception caused by network attack, the exception caused by system defect or the exception caused by external interference. Therefore, it can play a guarantee role in the abnormalities caused by network security and functional safety at the same time.

Compared with the prior art, the disclosure has the following obvious prominent substantive features and advantages:

1. The disclosure adopts the idea of endogenous security, and enhances its functional safety and network security capabilities at the same time to resist known and unknown system failures and various network attacks by implementing multiple heterogeneous units of the perception and decision-making module.

2. The method of the disclosure adopts the idea of endogenous security to provide a new scheme for the integrated enhancement of functional safety and network security for the intelligent connected vehicle.

3. The method of the disclosure is simple, easy to operate, low in cost, and suitable for popularization and use.

SPECIFIC IMPLEMENTATION MODE

The above scheme is further described with specific implementation examples. The preferred embodiments of the disclosure are detailed as follows:

Embodiment 1

Figure 1:
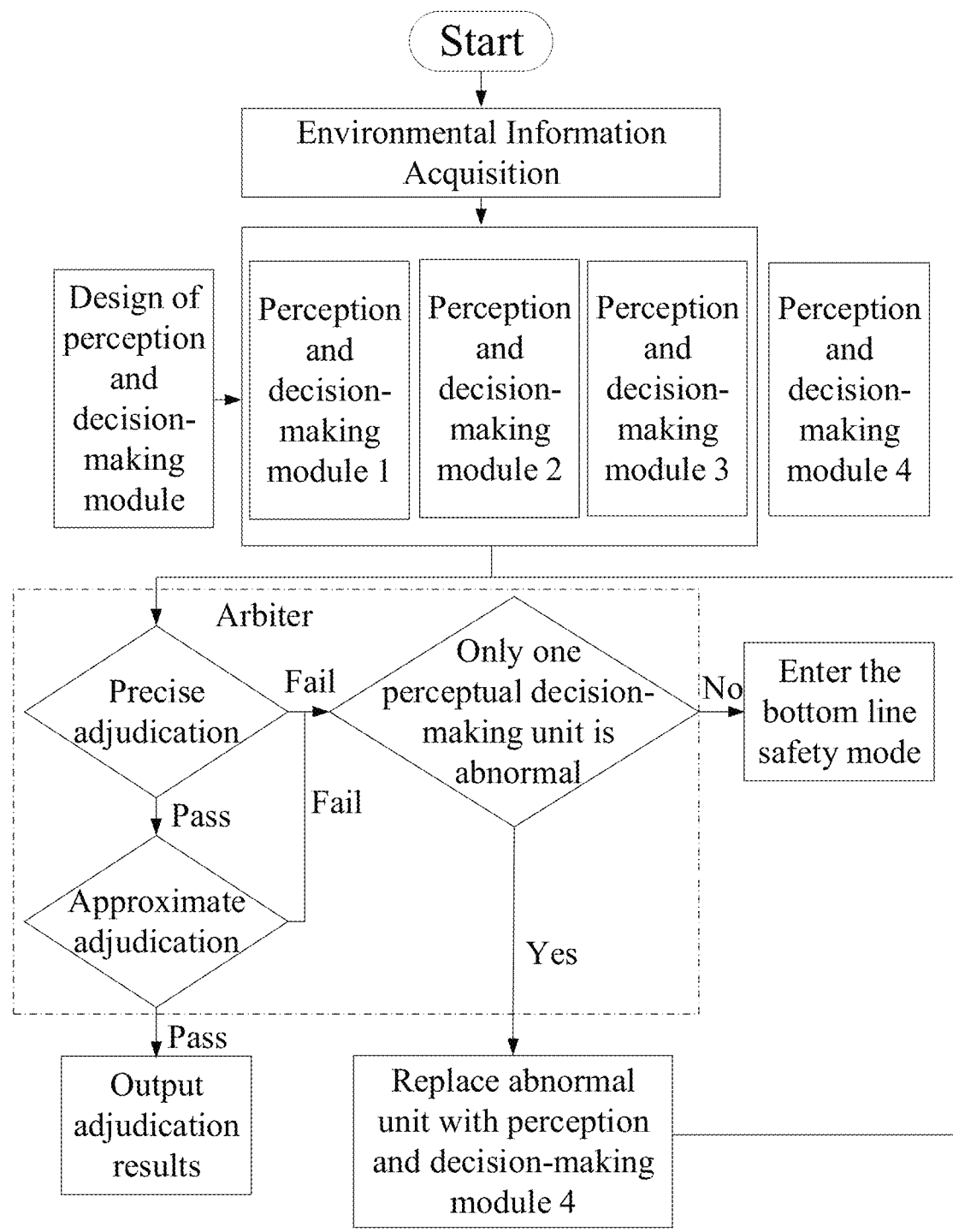
FIG. 1 is the flow chart of the function safety and network security endogenous guarantee method of the intelligent connected vehicle perception and decision-making module of the disclosure.
Figure 2:
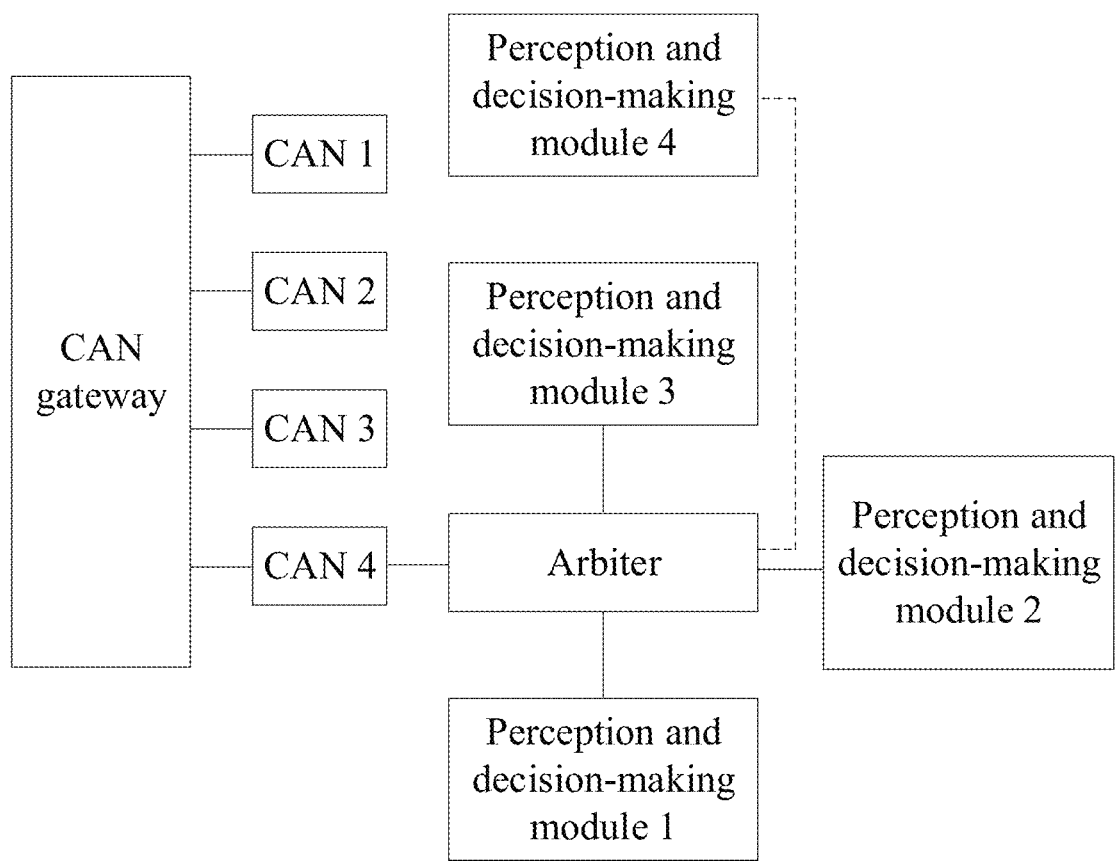
FIG. 2 is the system deployment diagram of the functional safety and network security endogenous guarantee method of the intelligent connected vehicle perception and decision-making module of the disclosure.

In this embodiment, referring to FIG. 1 and FIG. 2, a method of endogenous guarantee for the functional safety and network security of the intelligent connected vehicle perception and decision-making module, includes the following steps:

(1) Design and implement multiple heterogeneous perception and decision-making units and deploy them on vehicles. The main features of multiple perception and decision-making units include:

(1.1) It contains a higher-level and several lower-level perception and decision-making units. The higher-level perception and decision-making unit described above supports autopilot of SAE L3, L4 or L5, while the lower-levels support the SAE L3 or L2.

(1.2) The higher-level perception and decision-making unit described as the main brain of autopilot has the components and functions, including light detection and ranging (LIDAR), radio detection and ranging radar, camera, global positioning system (GPS), inertial measurement unit (IMU), odometer sensor, traffic signal detection (TSD) subsystem, moving object tracking (MOT) subsystem, mapper subsystem, localizer subsystem, and so on, which required to support autopilot of SAE L3, L4 or L5. It receives all kinds of sensor data and fuses data to get the needed information to the car to complete its task, while the information includes the info of pedestrians, vehicles and obstacles, the info of lane lines, driving areas, traffic signs and signals, and the info of unmanned vehicle positioning and map based on GPS and IMU inertial navigation. In addition, based on the above sensory information, the main brain combines the prior information of road network, traffic rules and automotive dynamics to form route planning, path planning, behavior selection, motion planning, obstacle avoidance and control decision-making.

(1.3) The described multiple relatively low-level perception and decision units should have the components and perception functions that required to support autopilot of SAE L2 or L3. And components include radio detection and ranging radar, camera, autopilot sensors of L2 or L3, while functions include obstacle detection, collision warning, lane detection and lane deviation warning.

(1.4) The higher-level perception and decision-making unit described here is an L4 self-automatic driving perceptual decision unit with the perceptual and planning functions described in Section (1.2), which forms the decision results for auto-driving and is ultimately sent to the various ECU execution components of the vehicle to achieve control over the vehicle. Set the decision results to: $F=\{x,y,z,w,u,v \ldots\}$, where x, y etc. represents the decision results given by the perceptual decision unit, including turning, accelerating, braking, parking.

(1.5) The multiple relatively low-level perception and decision-making units described are composed of one L3 and two L2 perceptual decision units that have the perceptual capabilities in the step (1.3) and are able to form auto-driving decision results based on the perceptual results. The decision results are: $W=\{x,y,z,w,u \ldots\}$, $U=\{x,y,z,w\}$, $V=\{x,y,z,w\}$.

(1.6) The following relationships exist: $U \cap V \cap W \cap F=\{X,y,z,w\}$, where x,y,z,w are true-value type data, indicating whether to turn left, right, accelerated or braked, respectively.

(1.7) The high-level and several relatively low-level perception and decision-making units are all designed with isomerization, while selecting different hardware platforms, such as field bus, arm and x86 platforms, different operating systems, and different perceptual decision modules.

(2) During vehicle driving, each perception and decision-making unit makes decisions based on the perceived information. Its main features include:

(2.1) The decision results incorporate information perceived from multiple dimensions, including video information, radar information, vehicle location, speed, and acceleration.

(2.2) The decision algorithm for each unit covers at least three cases:

(2.2.1) It makes a turn decision based on the perceived results and issues turn instructions, including the target turn angle and the target angular speed of steering wheel.

(2.2.2) A brake command is sent when the headway $\tau=l/v$ is detected to be less than a certain value, where l represents the distance from the shop and v represents the speed of the car.

(2.2.3) A brake command is sent when the time-to-collision $ttc=l/(v_1-v_2)$ is detected to be less than a certain value, where l represents the distance from the shop, $v_1$ represents the speed of the car and $v_2$ indicates the speed of the vehicle ahead or the speed of the pedestrian.

(3) The decision results of the high-level units and two relatively low-level units in the four perception and decision-making units are sent to the arbiter for adjudication, and another low-level perceptual decision unit is always online, but not on the loop, and will not participate in adjudication temporarily. The decision result of the i-th perceptive decision module sent to the arbiter is represented as $<x_i,y_i,z_i,w_i|a_i,b_i,c_i,d_i>$, where i=1,2,3, $x_i,y_i,z_i,w_i$ is true-value type data, indicating whether to turn left, right, accelerate and brake; $a_i,b_i,c_i,d_i$ is floating point data, representing the target angle of left turn, the target angle of right turn, the acceleration and the braking force respectively. The adjudication process is divided into two stages, including:

(3.1) Precise decision stage:

At this stage, the arbiter judges whether $(x_1,y_1,z_1,w_1)=(x_2,y_2,z_2,w_2)=(x_3,y_3,z_3,w_3)$ is true. If the equation is true, it enters the approximate adjudication stage. Otherwise, it is considered that there is an unsafe perception and decision-making unit and outputs $\perp$.

(3.2) Approximate adjudication stage:

At this stage, for any $i,j \in 1,2,3$, $i \neq j$, the arbiter judges whether $\sqrt{(a_i-a_j)^2+(b_i-b_j)^2+(c_i-c_j)^2+(d_i-d_j)^2} \leq \theta$ is true, where θ indicates the approximate coefficient allowed by the system. If the equation is true, the decision results of the higher-level perception and decision-making unit will be output. Otherwise, the 1 will be output.

(4) When the arbiter outputs a decision result, the decision result will be directly sent to the CAN bus, and the vehicle will execute the command Otherwise, when the arbiter outputs $\perp$, the vehicle will make the following processing according to the situation:

(4.1) If there exists $i,j \in 1,2,3$, $i \neq j$, that makes $(x_i,y_i,z_i,w_i)=(x_j,y_j,z_j,w_j)$ and $\sqrt{(a_i-a_j)^2+(b_i-b_j)^2+(c_i-c_j)^2+(d_i-d_j)^2} \leq \theta$ tenable, then replacing the k-th unit by using the online unit that does not participate in the adjudication, where $k \in \{1,2,3\}$, $k \neq i$, $k \neq j$.

(4.2) Otherwise, the vehicle will operate according to the preset bottom line security procedure until it stops or someone intervenes.

In this embodiment, the functional safety and network security endogenous guarantee method of the intelligent connected vehicle perception and decision-making module designs and implements four perception and decision-making units with the same function and a certain degree of heterogeneity, and deploys them on the vehicle. The four units respectively generate real-time vehicle control decision results based on the perceived information, while the arbiter makes accurate and approximate decisions based on the decision results of three perceptual decision units. Finally, the vehicle executes the CAN command, or replaces the abnormal unit and makes a new ruling, or operates according to the fault mode until it stops according to the different ruling results of the arbiter. The method of this embodiment adopts the idea of endogenous security to provide a new scheme for the integrated enhancement of functional safety and network security for the intelligent connected vehicle. This embodiment adopts the idea of endogenous security, and enhances its functional safety and network security capabilities at the same time to resist known and unknown system failures and various network attacks by implementing multiple heterogeneous units of the perception and decision-making module. The method of this embodiment is simple, easy to operate, low in cost, and suitable for popularization and use.

Embodiment 2

This embodiment is basically the same as Embodiment 1, with the following special features:

In this embodiment, as shown in FIG. 1 and FIG. 2, in the step (3), the two stages of the decision are all dependent on hardware implementation.

In this embodiment, in the step (4), the replacement process completes the replacement of abnormal units in seconds by quickly scheduling the 'online not in the loop' perception and decision-making units to 'go up the loop'.

In this embodiment, the adjudication process does not pay attention to the cause of the exception, but only makes the exception judgment through the comparison strategy. The reason of the exception is the system exception caused by network attack, the exception caused by system defect or the exception caused by external interference. Therefore, it can play a guarantee role in the abnormalities caused by network security and functional safety at the same time.

The method of this embodiment adopts the idea of endogenous security to provide a new scheme for the integrated enhancement of functional safety and network security for the intelligent connected vehicle. This embodiment adopts the idea of endogenous security, and enhances its functional safety and network security capabilities at the same time to resist known and unknown system failures and various network attacks by implementing multiple heterogeneous units of the perception and decision-making module. The method of this embodiment is simple, easy to operate, low in cost, and suitable for popularization and use.

The embodiments of the disclosure are described in combination with the attached drawings, but the disclosure is not limited to the above embodiments, which can also make various changes according to the purpose of the disclosure. Any change, modification, substitution, combination or simplification made according to the spirit and principle of the technical solution of the disclosure shall be the equivalent replacement method. As long as it conforms to the purpose of the disclosure and does not deviate from the technical principle and concept of the disclosure, it belongs to the protection scope of the disclosure.

What claimed is:

1. An endogenous guarantee method for functional safety and network security of an intelligent connected vehicle perception decision-making module comprising the following steps:

(1) designing and implementing multiple heterogeneous perception and decision-making units and deploying the multiple heterogeneous perception and decision-making units on vehicles, wherein:

each of the multiple heterogeneous perception and decision-making units comprises a higher-level perception and decision-making unit and several lower-level perception and decision-making units;

the higher-level perception and decision-making unit is configured to support autopilot L3, L4 or L5, while the lower-level perception and decision-making units support L3 or L2;

the higher-level perception and decision-making unit is configured to be a main brain of autopilot comprising light detection and ranging (LIDAR), radio detection and ranging radar, camera, a global positioning system (GPS), an inertial measurement unit (IMU), an odometer sensor, a traffic signal detection (TSD) subsystem, a moving object tracking (MOT) subsystem, a mapper subsystem, and a localizer subsystem to support the autopilot L3, L4 or L5;

the higher-level perception and decision-making unit is configured to receive sensor data and fuses the sensor data to obtain needed information for a vehicle to complete a task, wherein the information includes information of pedestrians, vehicles and obstacles, information of lane lines, driving areas, traffic signs and signals, and information of unmanned vehicle positioning and a map based on the GPS and an IMU inertial navigation;

based on the sensor data, the main brain combines prior information of a road network, traffic rules and automotive dynamics to form route planning, path planning, behavior selection, motion planning, obstacle avoidance and control decision-making;

the multiple low-level perception and decision units comprise components and perception functions required to support autopilot L2 or L3; the components comprising radio detection and ranging radar, camera, autopilot sensors of L2 or L3, and the functions comprising obstacle detection, collision warning, lane detection and lane deviation warning;

the higher-level perception and decision-making unit comprises an L4 self-automatic driving perceptual decision unit which forms decision results for auto-driving and is configured to be sent to various electronic control unit (ECU) execution components of the vehicle to achieve control over the vehicle;

the decision results are set to: $F=\{x, y, z, w, u, v \ldots\}$, where $x, y, z, w, u, v \ldots$ represents the decision results given by the perceptual decision unit, including turning, accelerating, braking, parking;

the multiple relatively low-level perception and decision-making units comprise one L3 and two L2 perceptual decision units and are configured to form auto-driving decision results based on the perceptual results, wherein the decision results are: $W=\{x, y, z, w, u \ldots\}$, $U=\{x, y, z, w\}$, and $V=\{x, y, z, w\}$;

$U \cap V \cap W \cap F=(x, y, z, w)$, where $x, y, z, w$ are true-value type data, indicating whether to turn left, right, accelerate or brake, respectively;

the high-level perception and decision-making unit and the multiple low-level perception and decision-making units are all designed with different hardware platforms including field bus, arm and x86 platforms, different operating systems, and different perceptual decision modules;

(2) during vehicle driving, each perception and decision-making unit makes decisions based on the perceived information, wherein:

the decision results incorporate information perceived from multiple dimensions, comprising video information, radar information, vehicle location, speed, and acceleration;

a decision algorithm for each unit covers at least three cases:

a turn decision is made based on the perceived results and issues turn instructions, including a target turn angle and a target angular speed of a steering wheel;

a brake command is sent when a headway $\tau=l/v$ is detected to be less than a certain value, where l represents a distance from a shop and v represents a speed of the vehicle;

a brake command is sent when a time-to-collision ttc=$l/v_1-v_2$) is detected to be less than a certain value, where l represents a distance from a shop, $v_1$ represents a speed of the vehicle and $v_2$ indicates a speed of a vehicle ahead or a speed of a pedestrian, (3) the decision results of the high-level unit and the two low-level units of the four perception and decision-making units are sent to an arbiter for adjudication, and another low-level perceptual decision unit is always online, but not participate in adjudication temporarily; wherein:

a decision result of the i-th perceptive decision module sent to the arbiter is represented as $<x_i,y_i,z_i,w_i|a_i,b_i,c_i,d_i>$, where $i=1,2,3, x_i,y_i,z_i,w_i$ is true-value type data, indicating whether to turn left, right, accelerate and brake; $a_i, b_i, c_i, d_i$ is floating point data, representing the target angle of left turn, the target angle of right turn, the acceleration and the braking force respectively; the adjudication process is divided into two stages, comprising:

a precise decision stage, wherein the arbiter judges whether $(x_1,y_1,z_1,w_1)=(x_2,y_2,z_2,w_2)=(x_3,y_3,z_3,w_3)$ is true, and if so, the arbiter enters an approximate adjudication stage, otherwise, it is considered that there is an unsafe perception and decision-making unit and outputs $\perp$; and an approximate adjudication stage, wherein for any i, $j\in 1,2,3, i\neq j$, the arbiter judges whether $\sqrt{(a_i-a_j)^2+(b_i-b_j)^2+(c_i-c_j)^2+(d_i-d_j)^2}\leq\theta$ is true, where $\theta$ indicates an approximate coefficient allowed by the system, wherein if the equation is true, the decision results of the higher-level perception and decision-making unit will be output; otherwise, the $\perp$ will be output, (4) when the arbiter outputs a decision result, the decision result is directly sent to the controller area network (CAN) bus, and the vehicle is configured to execute the command; otherwise, when the arbiter outputs $\perp$, the vehicle will make the following processing according to the situation:

if there exists i, $j\in 1,2,3, i\neq j$, that makes $(x_i, y_i, z_i, w_i)=(x_j,y_j,z_j,w_j)$ and $\sqrt{(a_i-a_j)^2+(b_i-b_j)^2+(c_i-c_j)^2+(d_i-d_j)^2}\leq\theta$ tenable, then replacing the k-th unit by using the low-level perceptual decision unit that is online but does not participate in the adjudication, where $k\in\{1,2,3\}$, $k\neq j$;

otherwise, the vehicle will operate according to a preset bottom line security procedure until the vehicle stops or a user intervenes.

2. The endogenous guarantee method according to the claim 1, wherein in step (4), the replacing completes replacement of an abnormal unit in seconds by quickly scheduling the perception and decision-making unit that is online but does not participate in the adjudication to participate in the adjudication.

3. The endogenous guarantee method according to the claim 1, wherein the adjudication process does not pay attention to the cause of exception, but only makes the exception judgment through a comparison strategy; and a reason of the exception is the system exception caused by network attack, the exception caused by system defect or the exception caused by external interference such that the method is configured to play a guaranteed role in the abnormalities caused by network security and functional safety at the same time.

\* \* \* \* \*